US009778683B2

(12) United States Patent
Ho et al.

(10) Patent No.: US 9,778,683 B2
(45) Date of Patent: Oct. 3, 2017

(54) LOCKING MECHANISMS TO LOCK KEY MOVEMENT OF KEYBOARDS

(71) Applicant: HEWLETT-PACKARD DEVELOPMENT COMPANY, L.P., Houston, TX (US)

(72) Inventors: Chi-Chung Ho, Taipei (TW); Chun-Cheng Lin, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/026,368

(22) PCT Filed: Nov. 25, 2013

(86) PCT No.: PCT/US2013/071586
§ 371 (c)(1),
(2) Date: Mar. 31, 2016

(87) PCT Pub. No.: WO2015/076833
PCT Pub. Date: May 28, 2015

(65) Prior Publication Data
US 2016/0259370 A1    Sep. 8, 2016

(51) Int. Cl.
*G06F 1/16* (2006.01)
*H05K 5/00* (2006.01)

(52) U.S. Cl.
CPC .......... *G06F 1/1618* (2013.01); *G06F 1/1637* (2013.01); *G06F 1/1662* (2013.01); *G06F 1/1679* (2013.01); *G06F 1/1681* (2013.01)

(58) Field of Classification Search
CPC .... G06F 1/1618; G06F 1/1624; G06F 1/1662; G06F 1/1669; G06F 1/1637

USPC .......... 361/679.08–679.2; 400/294.2, 286.3, 400/274–276, 663, 676–678, 667
See application file for complete search history.

(56) References Cited

U.S. PATENT DOCUMENTS

| 5,602,715 A | * | 2/1997 | Lempicki | G06F 1/1616 200/344 |
| 5,635,928 A | * | 6/1997 | Takagi | G06F 1/1616 341/22 |
| 5,757,616 A | | 5/1998 | May et al. | |

(Continued)

FOREIGN PATENT DOCUMENTS

| EP | 3019926 A1 | 5/2016 |
| JP | 2004227420 A | 8/2004 |

OTHER PUBLICATIONS

Ben Lang, "Lenova Outs ThinkPad With 'Lift and Lock' Keyboard—Hands-on at IFA," Sep. 6, 2013, pp. 1-2, Ultrabooknews, Available at: http://ultrabooknews.com/2013/09/lenovo-thinkpad-yoga-business-ultrabook-convertible.

(Continued)

*Primary Examiner* — Anthony Haughton
(74) *Attorney, Agent, or Firm* — HP Patent Department

(57) ABSTRACT

An example device in accordance with an aspect of the present disclosure includes a base housing, display housing, and locking mechanism. The base housing includes a keyboard, and the display housing is pivotably coupled to the base housing. The locking mechanism is to lock key movement of the keyboard based on the display housing being pivoted according to a first range. The locking mechanism is to unlock key movement based on the display housing being pivoted according to a second range.

14 Claims, 10 Drawing Sheets

(56) References Cited

U.S. PATENT DOCUMENTS

| | | | | |
|---|---|---|---|---|
| 5,790,370 | A | * | 8/1998 | Merkel ................ G06F 1/1666 |
| | | | | 361/679.08 |
| 6,243,258 | B1 | | 6/2001 | Paratore |
| 6,529,370 | B1 | * | 3/2003 | Kamishima ........... G06F 1/1666 |
| | | | | 200/5 A |
| 7,477,508 | B1 | | 1/2009 | Pilkington et al. |
| 7,932,894 | B2 | | 4/2011 | Oakley |
| 8,289,688 | B2 | | 10/2012 | Behar et al. |
| 8,305,241 | B2 | * | 11/2012 | Wang .................... G06F 3/0202 |
| | | | | 200/43.11 |
| 2004/0114315 | A1 | | 6/2004 | Anlauff |
| 2006/0077622 | A1 | | 4/2006 | Keely et al. |
| 2010/0110625 | A1 | | 5/2010 | Chen |
| 2011/0170252 | A1 | | 7/2011 | Jones et al. |
| 2011/0228463 | A1 | | 9/2011 | Matagne |
| 2013/0063356 | A1 | | 3/2013 | Martisauskas |
| 2013/0170124 | A1 | * | 7/2013 | Pan ...................... H05K 5/0226 |
| | | | | 361/679.08 |
| 2013/0215565 | A1 | * | 8/2013 | Nakada ................ G06F 1/1681 |
| | | | | 361/679.09 |
| 2015/0316959 | A1 | * | 11/2015 | Senatori ............... G06F 1/1618 |
| | | | | 345/169 |

OTHER PUBLICATIONS

Duranske et al; "Keyboard Lock Mechanism", IP.com Journal, IP.com Inc., West Henrietta, NY, US, Apr. 1, 1978 (Apr. 1, 1978), XP013058461.

* cited by examiner

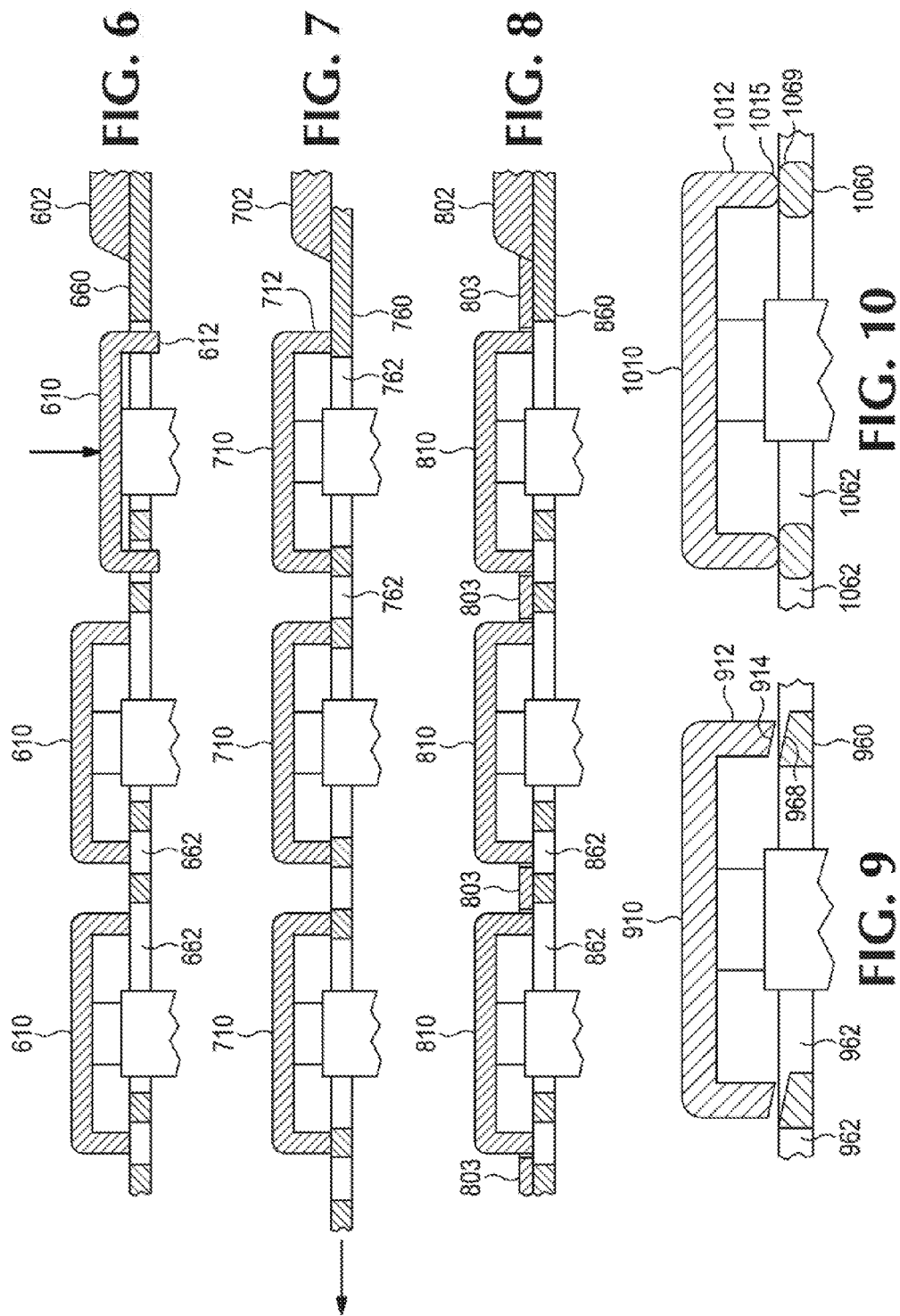

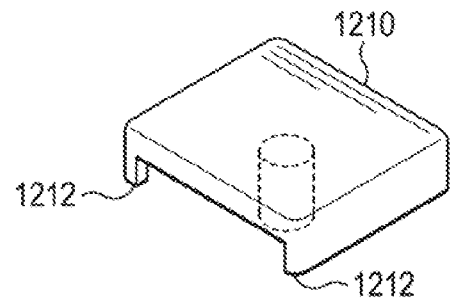
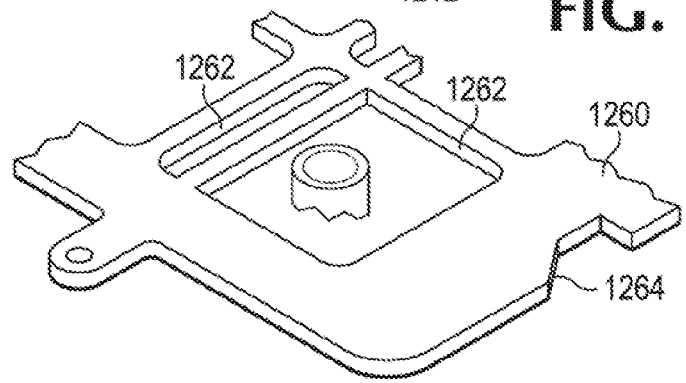
FIG. 12
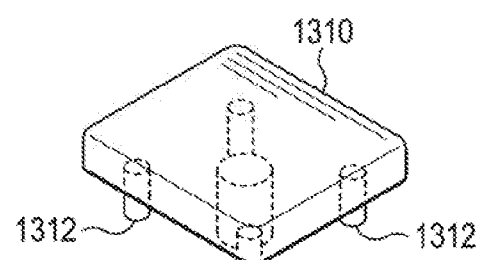
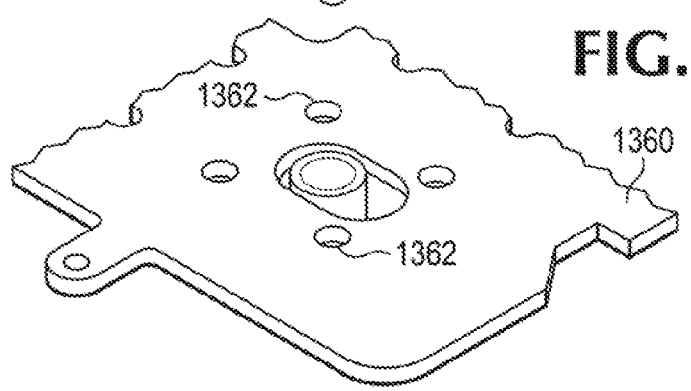
FIG. 13

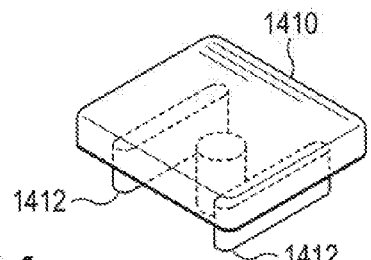
FIG. 14
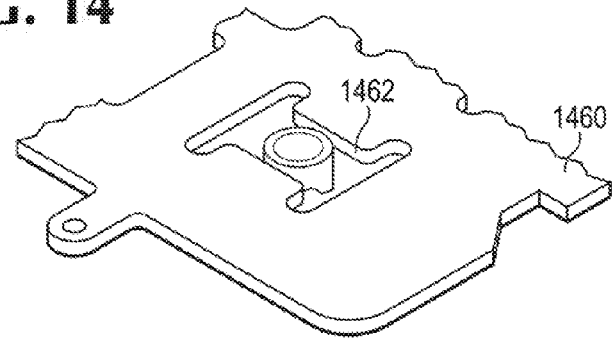
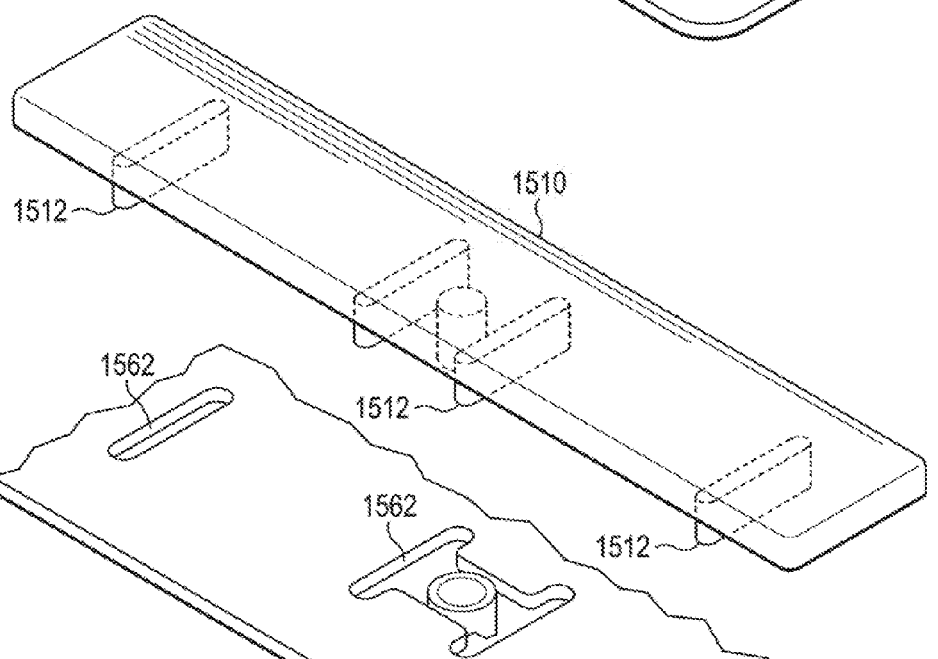
FIG. 15
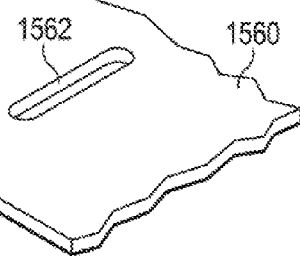

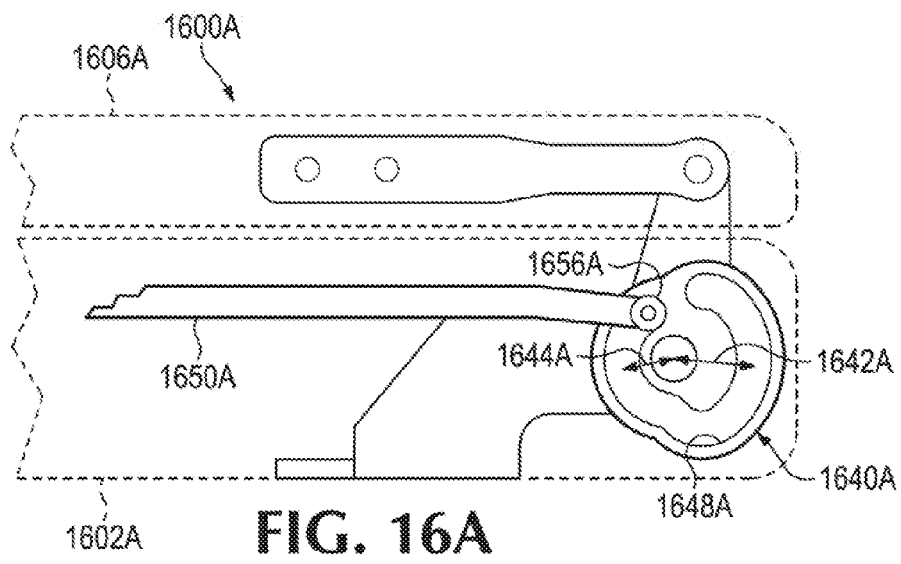
FIG. 16A
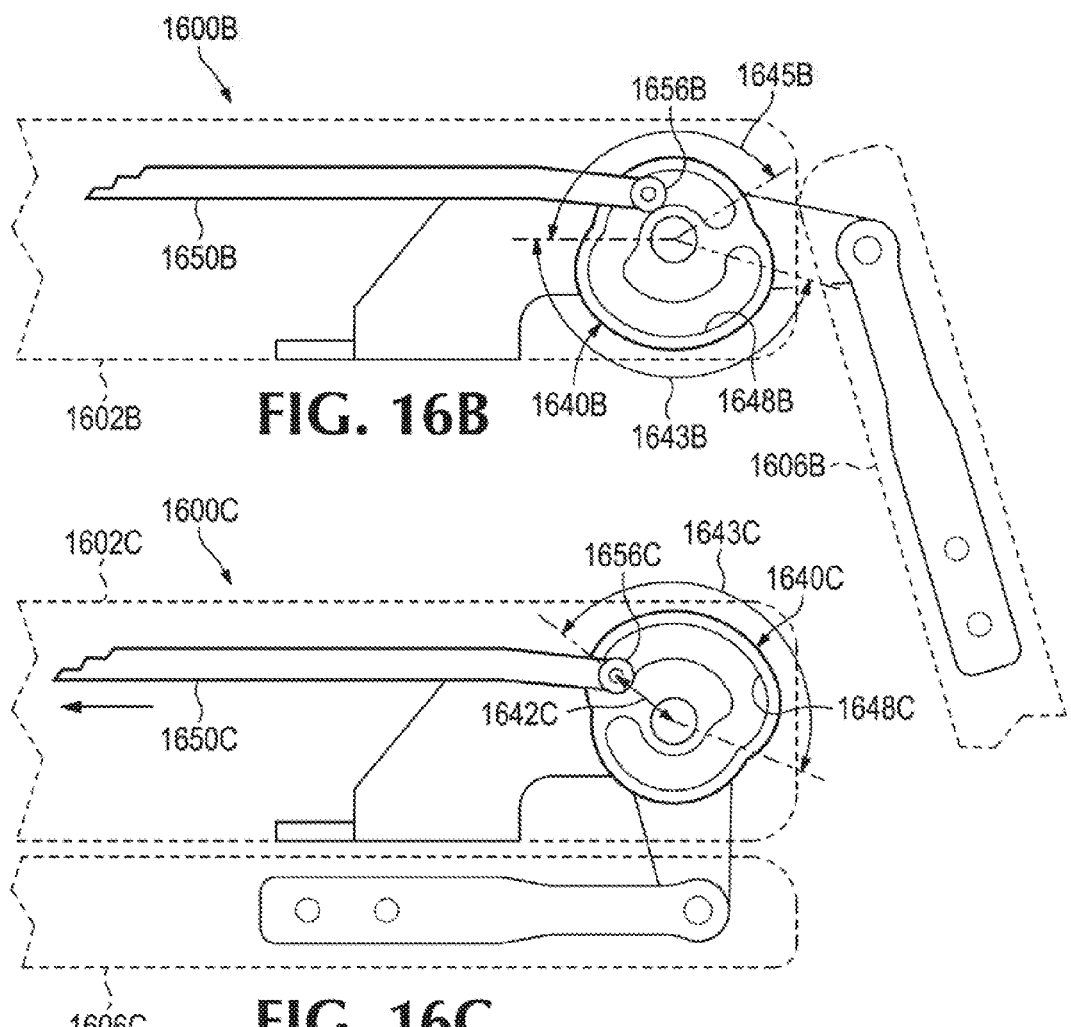
FIG. 16B
FIG. 16C

LOCKING MECHANISMS TO LOCK KEY MOVEMENT OF KEYBOARDS

BACKGROUND

A computing device may disable keyboard functionality using electrically-based or software-based approaches. When so disabled, the keyboard keys remain physically depressible.

BRIEF DESCRIPTION OF THE DRAWINGS/FIGURES

FIG. 6 is a side sectional view, along arrows 6-6 in FIG. 4, of a computing device including a locking plate in an unlocked position according to an example.

FIG. 7 is a side sectional view, along arrows 7-7 in FIG. 5, of a computing device including a locking plate in a locked position according to an example.

FIG. 8 is a side sectional view of a computing device including a locking plate in an unlocked position, and a cover plate, according to an example.

FIG. 9 is a side sectional view of a computing device including a beveled key support and locking plate in a locked position according to an example.

FIG. 10 is a side sectional view of a computing device including a rounded key support and locking plate in a locked position according to an example.

FIG. 12 is an exploded perspective view of a key and locking plate according to an example.

FIG. 13 is an exploded perspective view of a key and locking plate according to an example.

FIG. 14 is an exploded perspective view of a key and locking plate according to an example.

FIG. 15 is an exploded perspective view of a key and locking plate according to an example.

FIG. 16A is a side view of a computing device including a locking mechanism in an unlocked position according to an example.

FIG. 16B is a side view of a computing device including a locking mechanism in an unlocked position according to an example.

FIG. 16C is a side view of a computing device including a locking mechanism in a locked position according to an example.

DETAILED DESCRIPTION

Examples provided herein enable a keyboard to be physically, e.g., mechanically, locked, e.g., when a hinged portable computing device (laptop, notebook, etc.) is converted into a tablet mode. The portable computing device may include a hinged display that may be rotated through a range of 360 degrees of motion, including ranges that lock or unlock the keyboard. In an example tablet mode, a display may be fully, open, locating the keyboard at an underside of the convertible portable computing device. A user's hands may grip at least a portion of the keyboard, feeling the keys in this tablet mode. Regardless of whether the keys are electrically enabled or disabled, any key movement may provide an unsettling user experience, reducing confidence and the ability to safely grip the portable computing device.

Thus, mechanically locking the keyboard in accordance with the examples provided herein may prevent such undesirable user experiences, enabling keys of the keyboard to remain undepressed, to provide a reassuring solid gripping surface and enhanced user experience, e.g., in tablet mode. Examples may be used on various styles of keyboards including keyboards for portable and non-portable computing devices.

Figure 1:
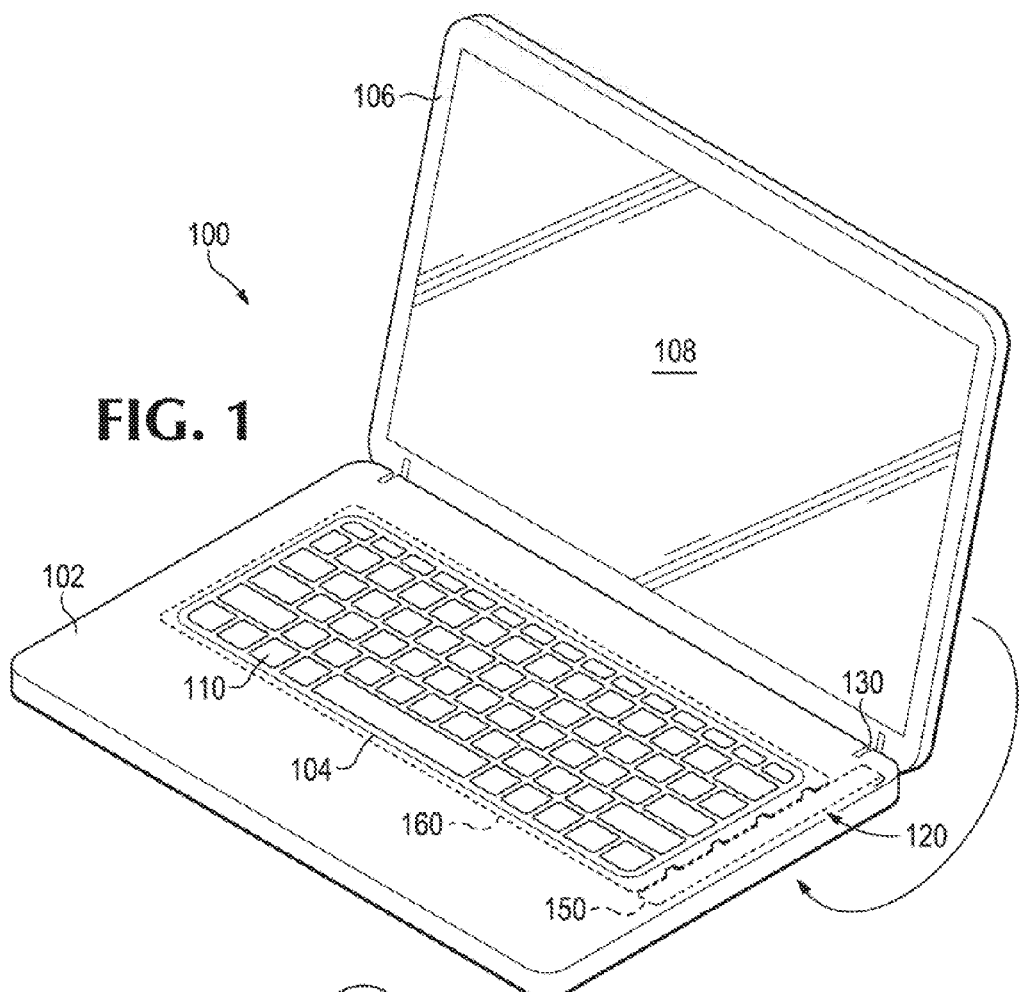
FIG. 1 is a perspective view of a computing device including a locking mechanism in an unlocked position according to an example.

FIG. 1 is a perspective view of a computing device 100 including a locking mechanism 120 in an unlocked position according to an example. The computing device 100 includes a display housing 106 and display 108, coupled via hinge 130 with a base housing 102 and keyboard 104 including keys 110, The locking mechanism 120 may include a linkage 150, locking plate 160, and hinge 130.

The computing device 100 is shown in a laptop configuration with the display in an upright position relative to the keyboard, and the display housing 106 is pivotable toward the keyboard side of the base housing 102 to close, and backward toward the opposite side of the base housing 102 for tablet mode.

The locking mechanism 120 may mechanically lock at least one key 110 of the keyboard 104, in response to positioning of the display housing 106 relative to the base housing 102. In an example, the locking mechanism 120 may respond to the display housing 106 and base housing 102 exceeding a threshold angle relative to each other. The locking mechanism 120 may identify the angle of the display housing 106 based on the hinge 130, causing the linkage 150 to actuate the locking plate 160 to lock the key(s) 110.

Figure 2:
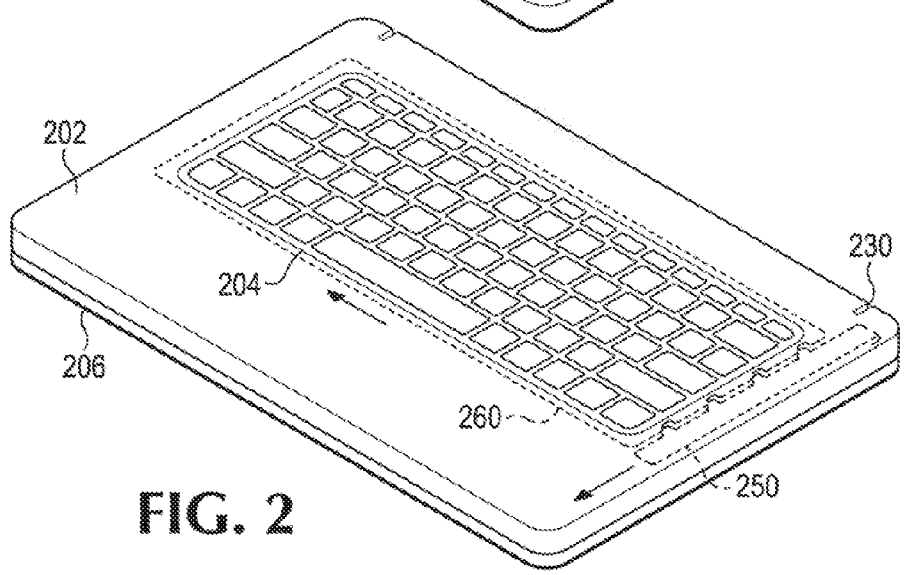
FIG. 2 is a perspective view of a computing device including a locking mechanism in a locked position according to an example.

FIG. 2 is a perspective view of a computing device including a locking mechanism in a locked position according to an example. The display housing 206 is rotated about hinge 230 away from the keyboard 204, placing the computing device into a tablet configuration. Accordingly, the linkage 250 of the locking mechanism is moved in the direction indicated by its corresponding arrow, thereby causing the locking plate 260 to move in the direction indicated by its corresponding arrow, to lock the keyboard 204.

Figure 3:
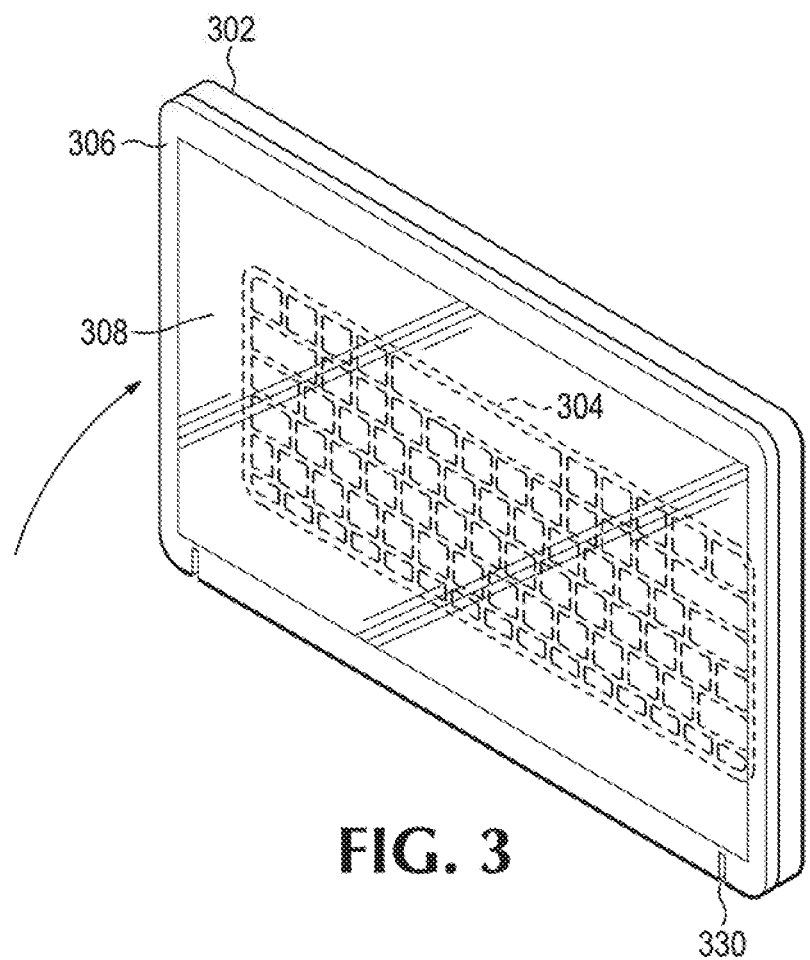
FIG. 3 is a perspective view of a computing device including a locking mechanism in a locked position according to an example.

FIG. 3 is a perspective view of a computing device including a locking mechanism in a locked position according to an example. The computing device is shown positioned for use of the display 308 in the tablet configuration, with the display housing 306 rotated about hinge 330 away from the keyboard 304 and against the based housing 302. The locking mechanism may lock the keyboard 304 in this arrangement, enabling the keyboard 304 to provide a rigid surface for handling the computing device easily and confidently.

Figure 4:
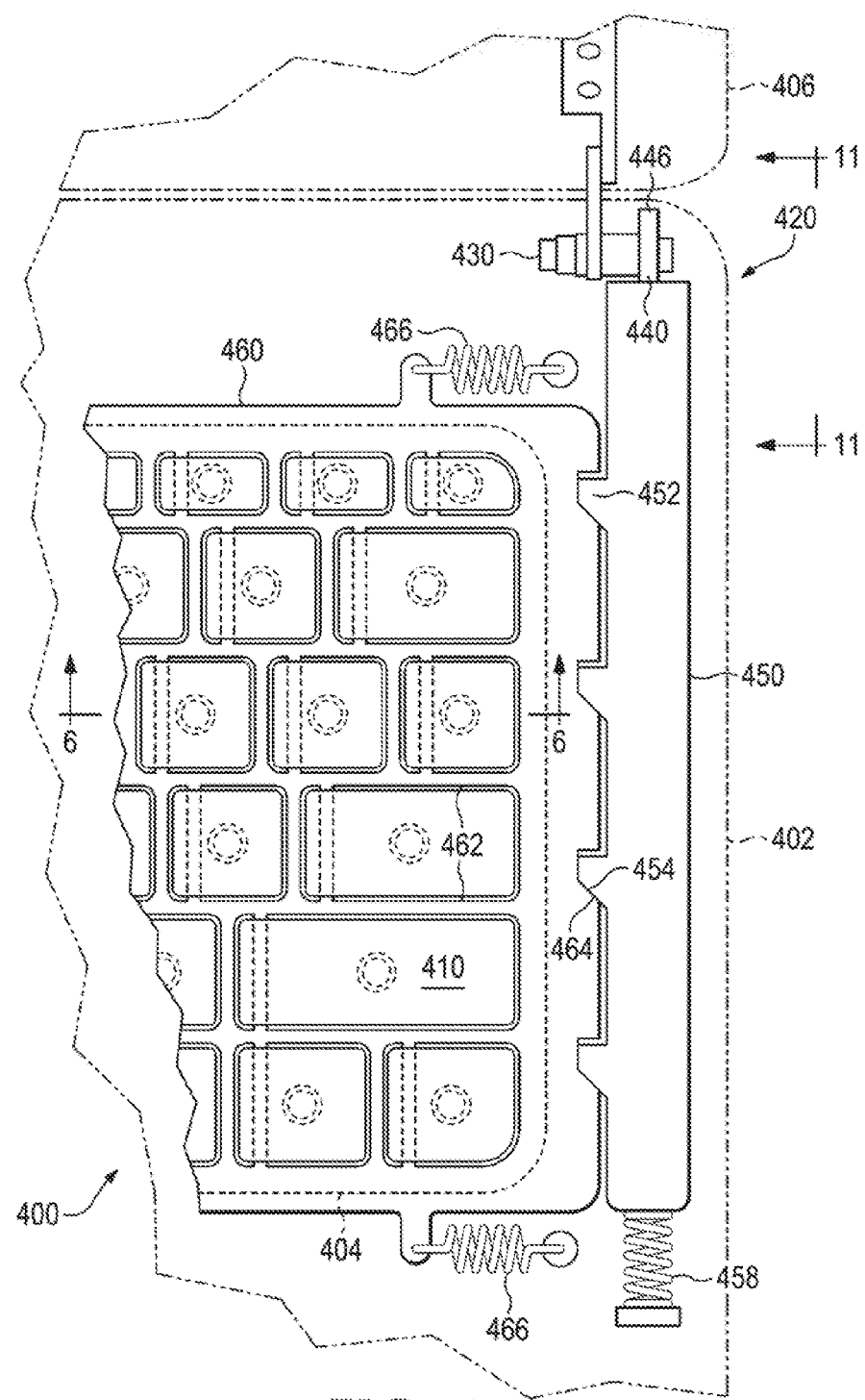
FIG. 4 is a top view of a computing device including a locking mechanism in an unlocked position according to an example.

FIG. 4 is a top view of a computing device $00 including a locking mechanism 420 in an unlocked position according to an example. The computing device 400 includes display housing 406, base housing 402, and keyboard 404 having keys 410. The locking mechanism 420 includes hinge 430, linkage 450, and locking plate 460. The hinge 430 includes wheel 440, shown as a cam having a lobe 446 rotated away from the linkage 450. The linkage 450 includes linkage tabs 452, linkage bevels 454, and linkage spring 458. The locking plate 460 includes key cutout(s) 462, locking plate bevels 464, and locking plate spring(s) 466.

The locking mechanism 420 may operate according to whether the display housing 406 has been rotated beyond a threshold angle to lock the keyboard 404. For example, the display housing 406 may rotate beyond a threshold angle contained within a rotation of 360 degrees from fully closed to fully open (with other threshold angles being supported in alternate examples). The wheel 440 may rotate along with rotation of the hinge 430, selectively causing the linkage 450 to move closer or farther to/from the hinge 430, according to a profile of the wheel 440 and location of at least one lobe 446. The linkage 450 may be biased toward the wheel 440 based on linkage spring 458.

The linkage 450 may transmit the force from wheel 440 to the locking plate 460, based on the linkage tabs 452. In the illustrated example device 400, the linkage tabs 452 include linkage bevels 454 that cooperate with corresponding locking plate bevels 464, to transmit the direction of motion to move the locking plate 460 approximately perpendicular to the motion of the linkage 450. The locking plate 460 may be biased toward the linkage 450 based on locking plate spring(s) 466. Although bevels are shown, other techniques may be used, such as slanted grooves and pins, levers, and so on.

The locking plate 460 may be positioned in a gap between a cap of the keys 410, and the underlying support board of the keyboard 404, to slide back and forth underneath the key caps. Thus, when in a locked position, the locking plate 460 may physically prevent the key caps from being depressed, providing a reassuring solid feeling. The locking plate 460 may move between the locked and unlocked positions based on very minor overall displacement, ensuring easy and rapid response based on a slight movement of the locking plate 460.

Figure 5:
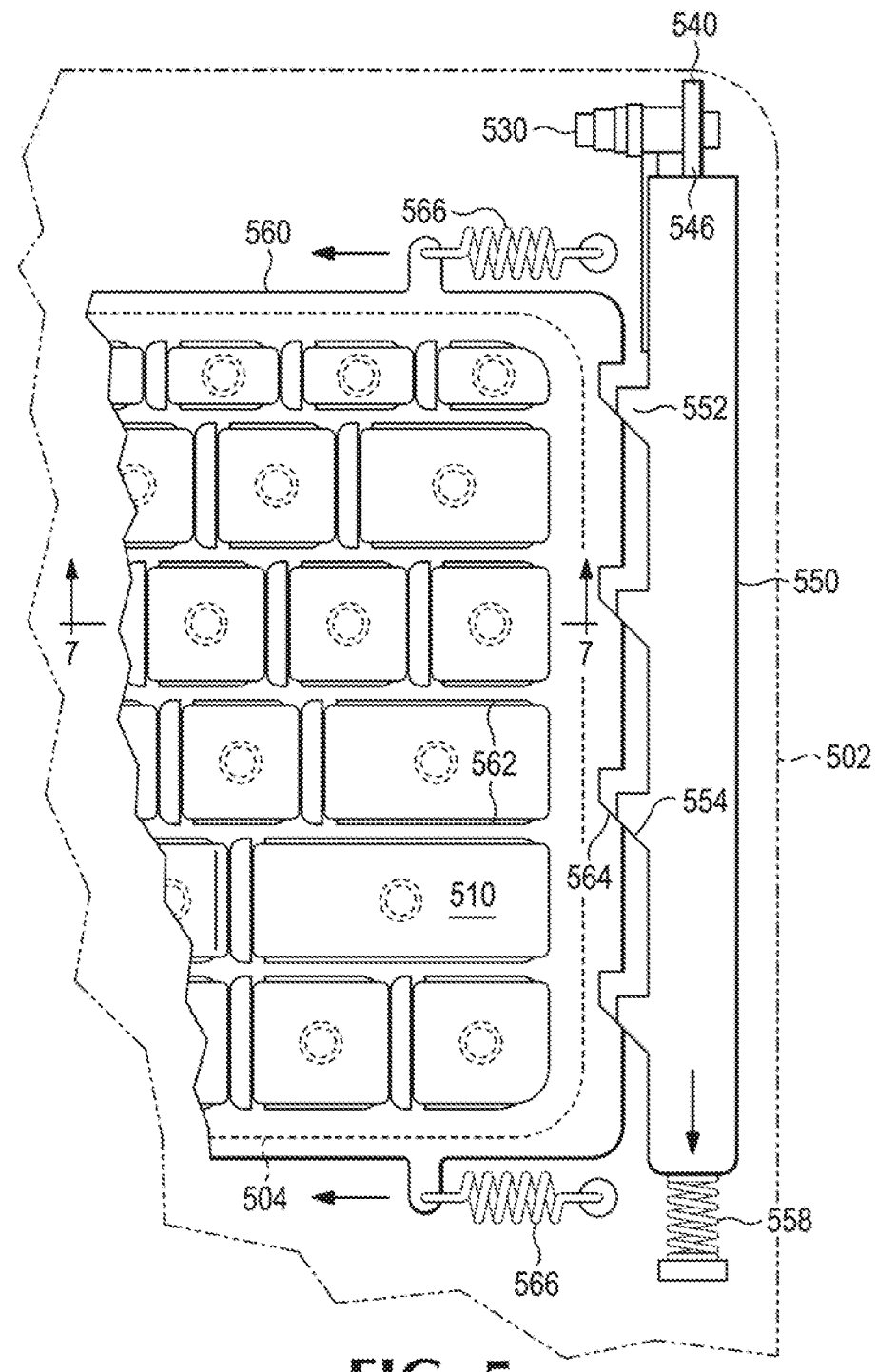
FIG. 5 is a top view of a computing device including a locking mechanism in a locked position according to an example.

FIG. 5 is a top view of a computing device including a locking mechanism in a locked position according to an example. Base housing 502 is shown, wherein the display housing (not shown) may be folded underneath the base housing 502 to lock the keyboard 504. Keyboard 504, having keys 510, is disposed in the base housing 502. The locking mechanism includes hinge 530, linkage 550, and locking plate 560. The hinge 530 includes wheel 540, shown as a cam having a lobe 546 rotated toward the linkage 550. The linkage 550 includes linkage tabs 552, linkage bevels 554, and linkage spring 558. The locking plate 560 includes key cutout(s) 562, locking plate bevels 564, and locking plate spring(s) 566.

The linkage 550 has been pushed downward by wheel 540 as indicated by the corresponding arrow, compressing spring 558 and causing the linkage tabs 552 to push the locking plate 560 laterally as indicated by the corresponding arrows. Accordingly, the key cutouts 562 are not aligned to allow the keys 510 to be depressed, and the keys 510 are prevented from being depressed. As shown in FIG. 5, a key 510 may be supported by the locking plate 560 at a periphery of the key cap. In an example, corners and/or edges of the key cap may be supported simultaneously, resulting in a stable mechanical locking of the key and minimizing wobble in the locked keys. In the locked position, the locking plate 560 may support additional portions of the periphery of the key cap, such as one or more full edges.

FIG. 6 is a side sectional view, along arrows 6-6 in FIG. 4, of a computing device including a locking plate 660 in an unlocked position according to an example. The locking plate 660 is positioned relative to the base housing 602 to align the key cutouts 662 of the locking plate 660 with key supports 612 of the keys 610. Accordingly, keys 610 may freely be depressed without being mechanically blocked by the locking plate 660.

FIG. 7 is a side sectional view, along arrows 7-7 in FIG. 5, of a computing device including a locking plate 760 in a locked position according to an example. The locking plate 760 is positioned relative to the base housing 702 to prevent the key cutouts 762 of the locking plate 760 from being aligned with key supports 712 of the keys 710. Accordingly, keys 710 are mechanically blocked by the locking plate 760 from being depressed.

FIG. 8 is a side sectional view of a computing device including a locking plate 860 in an unlocked position, and a cover plate 803, according to an example. The locking plate 860 is slidable relative to the base housing 802. The cover plate 803 may protect and isolate the locking plate 860 (e.g., prevent dust or debris from blocking operation of the locking plate 860), as well as visibly conceal operation of the locking plate 860.

FIG. 9 is a side sectional view of a computing device including a beveled key support 912 and locking plate 960 in a locked position according to an example. The key support 912 is shaped with a key support angle 914, to reduce a likelihood of binding between the key support 912 and the locking plate 960. The locking plate 960 similarly may include a locking plate angle 968. The angles may compensate for situations when the key 910 is slightly misaligned and/or depressed into the key cutout 962 when the locking plate 960 is in the unlocked position, and actuation of the locking plate 960 may urge the key 910 upward to the fully non-depressed position when moving back to the locked position as illustrated. FIG. 9 shows the key support 912 and locking plate 960 being angled, and in alternate examples one or more features may include or omit the angle.

FIG. 10 is a side sectional view of a computing device including a rounded key support 1012 and locking plate 1060 in a locked position according to an example. The key support 1012 is shown having a key support curve 1015. Similarly, the locking plate 1060 is shown having a locking plate curve 1069. The curves may compensate for slight misalignment/depressing of the key 1010, and reduce likelihood of binding between the key support 1012 and the locking plate 1060. For example, the curves may cause a slightly depressed or tilted key to be urged upward to a fully extended position, in response to the locking plate 1060 being moved from the unlocked position to the locked position. FIG. 10 shows the key support 1012 and locking plate 1060 being curved, and in alternate examples one or more features may include or omit the curve, and/or combine curves, angles, and other shaped features.

Figure 11A:
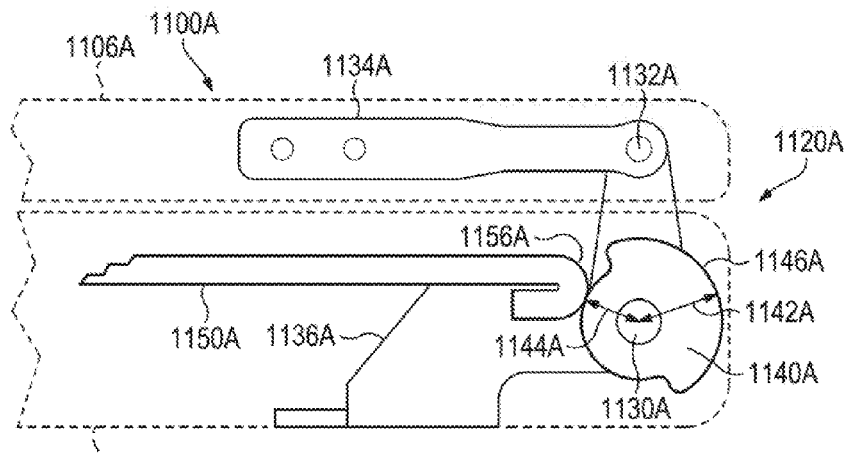
FIG. 11A is a side view, along arrows 11-11 in FIG. 4, of a computing device including a locking mechanism in an unlocked position according to an example.

FIG. 11A is a side view, along arrows 11-11 in FIG. 4, of a computing device 1100A including a locking mechanism 1120A in an unlocked position according to an example. The display housing 1106A is coupled to the base housing 1102A based on the display mount 1134A, first hinge 1130A, second hinge 1132A, and base mount 1136A. Wheel 1140A is coupled to the first hinge 1130A, to rotate with the display housing 1106A and interact with contact 1156A of the linkage 1150A. The wheel 1140A is shown as a cam, having a first radius 1142A corresponding to lobe 1146A, and a second radius 1144A. Computing device 1100A is shown in the closed arrangement, such that the linkage 1150A may be positioned toward the wheel 1140A according to the shorter second radius 1144A. The characteristics of the wheel 1140A may be chosen to correspond to a desired threshold angle of rotation of the hinge 1130A. Alternate examples may vary a size, radius, and angle of cam lobes for desired effects, such as providing a desired range of display angles corresponding to unlocked and/or locked positions of the locking plate.

The linkage 1150A may be formed of metal, and provide the contact 1156A based on a bend, to provide a curved surface for smooth interaction with the surface of the wheel 1140A, preventing the wheel 1140A from getting stuck. In an alternate example, the linkage 1150A may provide contact 1156A based on non-metal materials that may involve a non-curved surface. The linkage 1150A (as well as the locking plate, not shown) may be slidable along a plane that is off-center relative to the wheel 1140A. For example, the bend in the linkage 1150A may provide a point of contact 1156A to accommodate the wheel 1140A located below a plane of the linkage 1150A. Accordingly, linkage 1150A and locking plate may be located upward in the base housing higher than the hinge 1130A, near a surface of the base housing 1102A toward a keyboard.

Figure 11B:
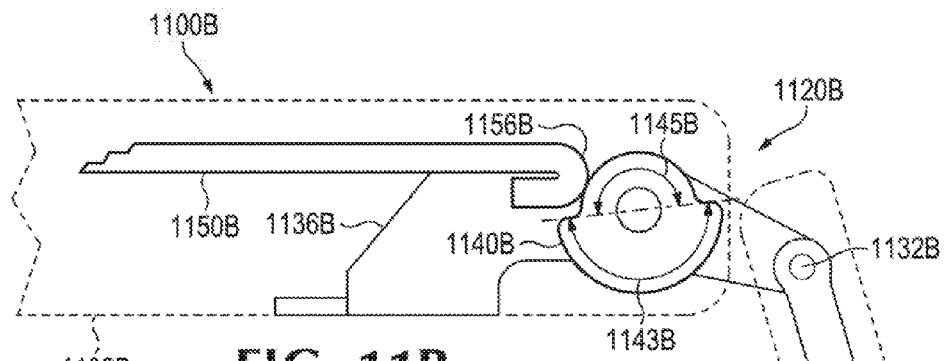
FIG. 11B is a side view, along arrows 11-11 in FIG. 4, of a computing device including a locking mechanism in an unlocked position according to an example.

FIG. 11B is a side view, along arrows 11-11 in FIG. 4, of a computing device 1100B including a locking mechanism 1120B in an unlocked position according to an example. The display housing 1106B is shown rotated to an intermediate position relative to the base housing 1102B and base mount 1136B, with the wheel 1140B positioned within a second range 1145B of rotation. The range of motion of the second hinge 1132B may be chosen to facilitate rotation of the wheel 1140B (e.g., limiting the second hinge 1132B to a maximum of 90 degrees forward/backward rotation). The second range 1145B of the wheel 1140B corresponds to an unlocked position wherein the linkage 1150B is positioned toward the wheel 1140B according to contact 1156B. The second range 1145B is shown as approximately equal to the first range 1143B. In alternate examples, the two ranges may differ from each other. As the display housing 1106B is rotated toward the back of the base housing 1102B (i.e., away from the keyboard side of the base housing 1102B), the wheel 1140B reaches a threshold angle, transitioning between the second and first ranges 1143B, 1145B.

System 1100B illustrates an example of a display housing 1106B that is movable relative to the base housing 1102B based on multiple pivots. In contrast, alternate examples may include a display housing 1106B that is directly hinged to the base housing 1102B, e.g., based on a single pivot about the wheel 1140B. Further, alternate examples may use non-hinge arrangements (e.g., mechanical linkages, sliders) to achieve the movable coupling between the display housing 1106B and base housing 1102B.

Figure 11C:
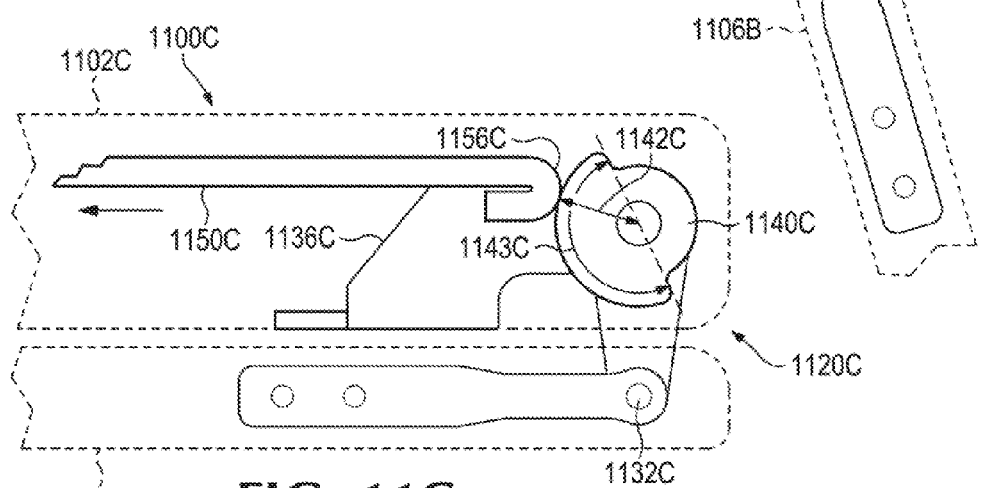
FIG. 11C is a side view, along arrows 11-11 in FIG. 4, of a computing device including a locking mechanism in a locked position according to an example.

FIG. 11C is a side view, along arrows 11-11 in FIG. 4, of a computing device 1100C including a locking mechanism 1120C in a locked position according to an example. The display housing 1106C is positioned in the tablet configuration, against a surface of the base housing 1102C away from the keyboard. Accordingly, the wheel 1140C is rotated beyond a threshold angle to mechanically lock the keyboard, within the first range 1143C corresponding to first radius 1142C. The wheel 1140C has thereby pushed the contact 1156C of the linkage 1150C, causing the linkage 1150C to move relative to the base mount 1136C and base housing 1102C and lock the keyboard.

FIG. 12 is an exploded perspective view of a key 1210 and locking plate 1260 according to an example. The key 1210 includes key supports 1212 formed by generally elongated extensions. The key cutouts 1262 are shaped to accommodate the key supports 1212. For example, the locking plate 1260 may achieve mechanical lock of one or more keys based on moving a relatively slight mount relative to the key supports 1212 (e.g., based on actuation according to the locking plate bevel 1264). Furthermore, the key supports 1212 may provide a stable mechanical locking support for the key 1210, preventing any wobble or lack of solid feeling when locked. In the example of FIG. 12, the key supports 1212 enable the key 1210 to be supported by the locking plate 1260 at four corners of the key and at two full edges. Accordingly, the key cap itself of the key 1210 may directly support the locked position, without a need to lock a key actuation mechanism (illustrated as a cylindrical structure located toward a center of the key 1210). In other words, a mechanism for providing locking support may be separate from the key actuation mechanism. The orientation/layout of the key supports 1212 and key cutouts 1262 may be oriented to accommodate a direction of sliding of the locking plate 1260. Furthermore, the key cutouts 1262 may be shaped differently than the key supports 1212 as illustrated throughout the figures, while still enabling the key 1210 to be stably supported when locked.

FIG. 13 is an exploded perspective view of a key 1310 and locking plate 1360 according to an example. The key supports 1312 are provided as columns, and the key cutouts 1362 are provided as corresponding holes. Accordingly, the orientation/layout of the key supports 1312 and key cutouts 1362 is symmetric and functional regardless of whether the locking plate 1360 slides side-to-side or up-and-down. The key supports 1312 enable symmetric four-corner support of the key 1310 when mechanically locked, resulting in a stable configuration. Further, when unlocked, the key supports 1312 (and other example key supports/cutouts as shown throughout the drawings) encourage smooth, wobble-free, proper actuation of the key 1310.

FIG. 14 is an exploded perspective view of a key 1410 and locking plate 1460 according to an example. The key supports 1412 are provided as recessed elongations, and the key cutout 1462 is provided as a corresponding accommodating shape.

FIG. 15 is an exploded perspective view of a key 1510 and locking plate 1560 according to an example. The key supports 1512 are provided as recessed elongations, and the key cutouts 1562 are provided as corresponding accommodating shapes. The key 1510 is somewhat elongated, illustrating the use of multiple key supports 1512 to provide a stable foundation when the key is locked. Furthermore, the key supports 1512 may serve as stabilizers that enable a smooth depressing motion of the key 1510 when the locking plate 1560 is in the unlocked position.

FIG. 16A is a side view of a computing device 1600A including a locking mechanism in an unlocked position according to an example. The computing device 1600A is in a closed configuration, with display housing 1606A facing a surface of the base housing 1602A toward a keyboard. The linkage 1650A may be actuated based on a pin 1656A that rides in a channel 1648A of the wheel 1640A. The channel 1648A follows a path including a first radius 1642A and second radius 1644A, to actuate the linkage 1650A. Furthermore, the channel 1648A enables the wheel 1640A to pull as well as push, on the linkage 1650A, enabling the embodiment to achieve full actuation of the linkage 1650A without a need for a linkage spring not shown).

FIG. 16B is a side view of a computing device 1600B including a locking mechanism in an unlocked position according to an example. The display housing 1606B is shown rotated to an intermediate position relative to the base housing 1602B, with the wheel 1640B positioned within a second range 1645B of rotation. The second range 1645B corresponds to an unlocked position wherein the linkage 1650B is positioned toward the wheel 1640B according to pin 1656B riding in the channel 1648C. The second range 1645B is shown as having a range of rotation that is less than the first range 1643B, although these ranges may vary in alternate examples. As the display housing 1606B is rotated toward the back of the base housing 1602B (i.e., away from the keyboard side of the base housing 1602B), the wheel 1640B reaches a threshold angle, to transition between the second and first ranges 1645B, 1643B associated with causing movement of the linkage 1650B.

FIG. 16C is a side view of a computing device 1600C including a locking mechanism in a locked position according to an example. The display housing 1606C is positioned in the tablet configuration, against a surface of the base housing 1602C away from the keyboard. Accordingly, the wheel 1640C is rotated beyond a threshold angle to mechanically lock the keyboard, within the first range 1643C corresponding to first radius 1642C. The wheel 1640C thereby may push the pin 1656C of the linkage 1650C, causing the linkage 1650C to move relative to the base housing 1602C as indicated by the corresponding arrow. Conversely, rotation of the wheel 1640C toward the laptop configuration can cause the pin 1656C to ride in channel 1648C to assume the lower second radius associated with an unlocked position.

Figure 17:
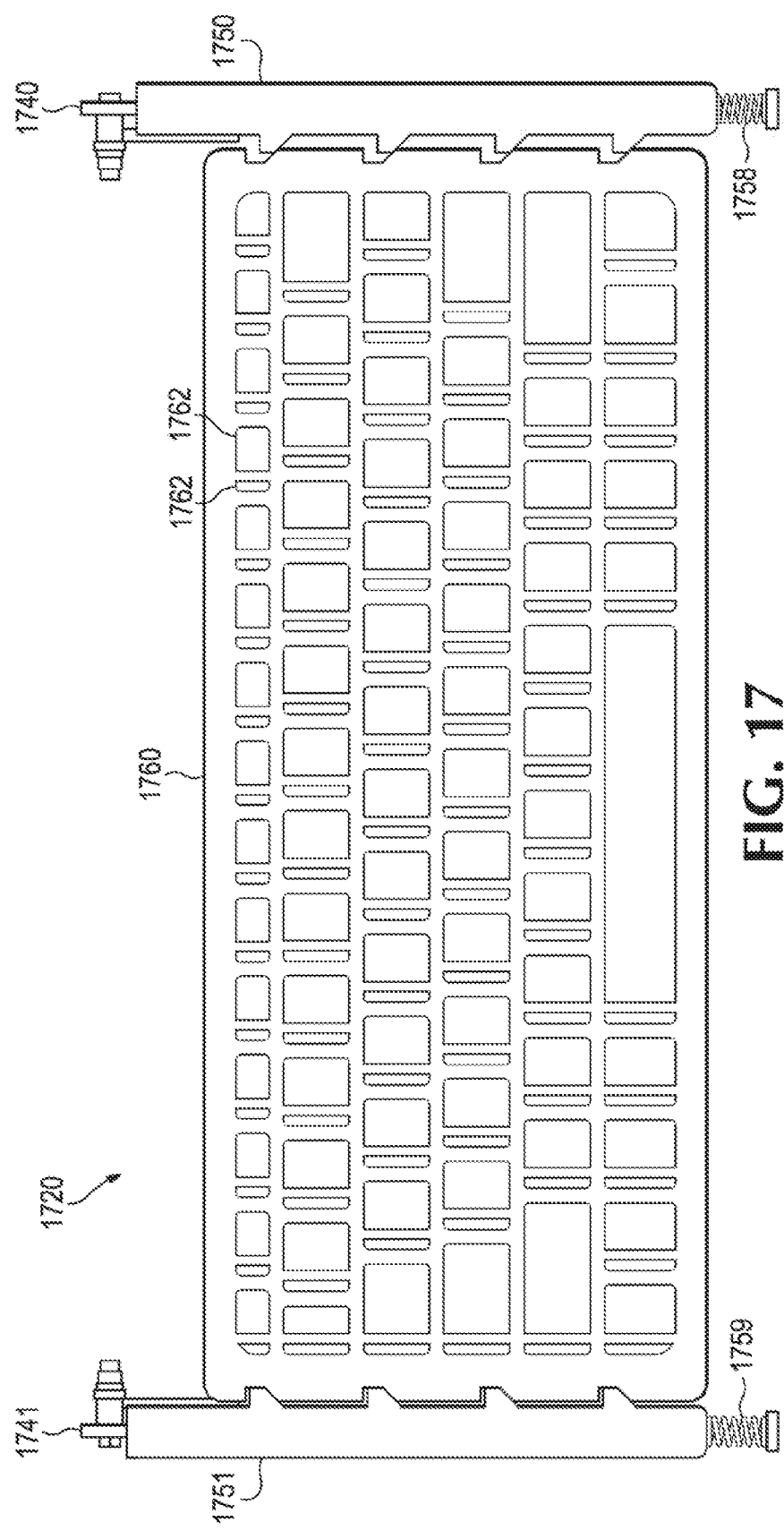
FIG. 17 is a top view of a locking mechanism in a locked position according to an example.

FIG. 17 is a top view of a locking mechanism 1720 in a locked position according to an example. The locking mechanism 1720 includes first and second wheels 1740, 1741, first and second linkages 1750, 1751, first and second linkage springs 1758, 1759, and locking plate 1760. The locking plate includes a plurality of key cutouts 1762. The first and second linkages 1750, 1751 are shown with first and second linkage springs 1758, 1759. However, alternate examples may include alternate linkages that do not need linkage springs (e.g., using a channel-based wheel and pin to ride the wheel channel).

The first wheel 1740 and the second wheel 1741 may be coupled to corresponding hinges that are actuated together according to movement of a display housing (not shown). However, the first wheel 1740 may be arranged to rotate out of phase along with rotation of the second wheel 1741. Accordingly, in response to the single movement of a display, one linkage may be moved to a displaced position, and the other linkage may be moved to a retracted position. For example, the first linkage 1750 is shown in the extended position, pushing the locking plate 1760 toward the left as shown in the drawing, moving the key cutouts 1762 into a locked position. The second linkage 1751, however, is shown in the retracted position based on the same display orientation used to arrange the first linkage 1750, allowing the locking plate 1760 to be moved toward the second linkage 1751. An opposite movement of the locking plate 1760 and linkages 1750, 1751 may similarly be accomplished in response to display housing movement, by retracting the first linkage 1750 while extending the second linkage 1751 based on the same motion of the display housing and the out-of-phase wheels 1740, 1741. Accordingly, the locking plate 1760 is actively controlled during locking and unlocking motions, without a need for a locking plate spring to unlock the locking plate 1760. Accordingly, the locking plate 1760 may be used in examples having tighter tolerances (e.g., keyboard/base/key-cap and mechanism housings) associated with higher friction, without needing to overcome that friction through the use of a spring. Furthermore, the locking plate 1760 may serve as a damper for the motion of the hinges, preventing operation of the hinges from becoming loose and/or augmenting or replacing a damping feature of the hinges.

In an alternate example, the plate and linkages may be incorporated as a single piece, accommodated by allowing the locking plate 1760 to be slidable along an axis that is rotated 90 degrees from that as illustrated in FIG. 17, e.g., parallel to the slidable axis of the first and second linkages 1750, 1751. For example, the unified locking plate/linkage piece may move together, along the same path/direction as the linkages would be displaced by the first and second wheels 1740, 1741. In such an example, the first and second wheels 1740, 1741 would no longer be out-of-phase with each other. The orientation of the key cutouts may be rotated 90 degrees, corresponding to this new direction that the locking plate 1760 would be slidable. For example, the keys may be unlocked when the locking plate 1760 is an the upper position corresponding to the position shown for the second linkage 1751, and locked when the locking plate 1760 is in a lower position corresponding to the position shown for the first linkage 1750. Accordingly, the locking plate 1760 in this alternate example would no longer move along a side-to-side direction as shown in FIG. 17 but rather an up-and-down motion in synch with the paired up-and-down motion of the linkages that would be in phase with each other in this alternate example.

What is claimed is:

1. A portable computing device comprising:
   a base housing including a keyboard and a first hinge, the first hinge coupled to a wheel and a second hinge;
   a display housing pivotably coupled to the base housing via the second hinge, wherein pivoting of the display housing rotates the wheel via movement of the coupled first and second hinges, and wherein the wheel moves along a first radius and a second radius;
   a locking mechanism including a locking plate to lock key movement of the keyboard based on the display housing being pivoted according to a first range, and unlock key movement based on the display housing being pivoted according to a second range, wherein the first range corresponds to wheel movement along the first radius, the second range corresponds to wheel movement along the second radius, and the first radius transitions into the second radius based on the display housing pivoting below a threshold angle; and
   a cover plate coupled to the locking plate to protect, isolate, and visibly conceal the locking plate.

2. The device of claim 1, wherein the first range is associated with the second hinge angled at least to the threshold angle, the second range is associated with the second hinge angled below the threshold angle, and the threshold angle is determined by whether the wheel is moving along the first or the second radius of the channel.

3. The device of claim 1, wherein the locking plate is slidably coupled to a base of the keyboard, movable between a first position to lock key movement, and a second position to unlock key movement.

4. The device of claim 3, wherein the locking plate includes a key cutout to block a key support when the locking plate is in the first position, and admit the key support when the locking plate is in the second position.

5. The device of claim 4, wherein the locking plate includes a plurality of key cutouts corresponding to a plurality of key supports of a key of the keyboard.

6. The device of claim 3, wherein the locking plate includes a beveled edge facing a key support.

7. The device of claim 3, wherein the locking plate is biased toward the second position.

8. The device of claim 3, wherein the locking mechanism includes a linkage to slidably actuate the locking plate based on the display housing position.

9. The device of claim 8, further comprising the wheel including a channel to slidably actuate the linkage, wherein the wheel is to rotate according to the display housing.

10. The device of claim 3, wherein the locking plate is movable toward the first position based on a first linkage, and toward the second position based on a second linkage.

11. A portable computing device comprising:
a base housing including a keyboard and a first hinge, the first hinge coupled to a cam and a second hinge;
a display housing including the second hinge to couple the display housing to the base housing, the display housing being
pivotable relative to the base housing to allow the display housing to be in contact with a first side of the base housing including the keyboard, or a second side of the base housing opposite the keyboard,
wherein pivoting of the display housing causes rotation of the cam due to movement of the coupled first and second hinges, and wherein, based on the display housing pivoting beyond a threshold angle, a first, lobed portion of the cam has a first radius that transitions into a second radius associated with a second portion of the cam; and
a locking mechanism including a locking plate having a locking plate angle to compensate for misalignment of the key into a key cutout, the locking mechanism to lock key movement of the keyboard based on the display housing pivoted beyond the threshold angle away from the keyboard housing, wherein key movement of a key is locked based on support at a periphery of a key cap of the key.

12. The device of claim 11, wherein the locking mechanism includes the cam profiled with the first radius at angles below the threshold angle, and the second radius at angles above the threshold angle.

13. A portable computing device comprising:
a base housing including a keyboard and a cam, the cam having a first portion comprising a lobed portion that has a greater radius than a radius of a second portion of the cam;
a display housing coupled to the base housing, wherein the display housing is movable relative to the base housing and rotates the cam when moved;
a locking mechanism including a locking plate to lock key movement of the keyboard based on the display housing being positioned relative to the base housing according to a first range associated with a first portion of the cam, and unlock key movement based on the display housing being positioned according to a second range associated with the second portion of the cam, wherein the locking plate includes a key cutout to lock movement of a key and a locking plate curve to compensate for misalignment of the key into the key cutout, and wherein the key cutout is shaped differently than a corresponding key support of the key.

14. The device of claim 13, wherein the locking plate is actuated by the cam and a linkage coupled to pivoting of the display housing.

* * * * *

UNITED STATES PATENT AND TRADEMARK OFFICE
CERTIFICATE OF CORRECTION

PATENT NO. : 9,778,683 B2  
APPLICATION NO. : 15/026368  
DATED : October 3, 2017  
INVENTOR(S) : Chi-Chung Ho et al.

Page 1 of 1

It is certified that error appears in the above-identified patent and that said Letters Patent is hereby corrected as shown below:

In Column 9, Line 39, in Claim 11, delete "a first," and insert -- a --, therefor.

In Column 10, Lines 2-3, in Claim 11, delete "a second portion of" and insert -- a remainder of --, therefor.

In Column 10, Line 18, in Claim 13, delete "than a radius of a" and insert -- than a --, therefor.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*